United States Patent
Sun (10) Patent No.: US 12,412,963 B2
(45) Date of Patent: Sep. 9, 2025

(54) ELECTROCHEMICAL DEVICE AND ELECTRONIC DEVICE

(71) Applicant: Ningde Amperex Technology Limited, Ningde (CN)

(72) Inventor: Zhenhe Sun, Ningde (CN)

(73) Assignee: NINGDE AMPEREX TECHNOLOGY LIMITED, Ningde (CN)

(*) Notice: Subject to any disclaimer, the term of this patent is extended or adjusted under 35 U.S.C. 154(b) by 715 days.

(21) Appl. No.: 17/708,916

(22) Filed: Mar. 30, 2022

(65) Prior Publication Data
US 2022/0320692 A1  Oct. 6, 2022

Related U.S. Application Data

(63) Continuation of application No. PCT/CN2021/122859, filed on Oct. 9, 2021.

(30) Foreign Application Priority Data

Mar. 30, 2021 (CN) .......................... 202110338853.6

(51) Int. Cl.
*H01M 50/489* (2021.01)
*H01M 10/04* (2006.01)
(Continued)

(52) U.S. Cl.
CPC ..... *H01M 50/489* (2021.01); *H01M 10/0431* (2013.01); *H01M 10/0463* (2013.01);
(Continued)

(58) Field of Classification Search
None
See application file for complete search history.

(56) References Cited

U.S. PATENT DOCUMENTS

| 5,981,107 A | 11/1999 | Hamano et al. |
| 2014/0287294 A1 | 9/2014 | Lee et al. |

(Continued)

FOREIGN PATENT DOCUMENTS

| CN | 104040756 A | 9/2014 |
| CN | 207217641 U | 4/2018 |

(Continued)

OTHER PUBLICATIONS

Machine translation of KR 20200036641, Apr. 2020.*
(Continued)

*Primary Examiner* — Jonathan Crepeau
(74) *Attorney, Agent, or Firm* — WHDA, LLP (57) ABSTRACT

An electrochemical device includes a housing, an electrode assembly and an electrolytic solution, and the electrode assembly and the electrolytic solution are disposed in the housing. The electrode assembly includes electrode plates and a separator disposed between adjacent electrode plates. The separator includes a porous substrate and a first bonding layer disposed on a surface of the porous substrate. The first bonding layer includes a plurality of first bonding regions spaced apart from each other. A thickness direction of the electrode assembly is defined as a first direction. In the first direction, a circumscribed rectangle of a projection of the electrode assembly possesses a diagonal line and a first side. An angle between the diagonal line and the first side is $\theta_1$. An angle between a projection of each of the plurality of first bonding regions and the first side is $\theta_2$, where $\theta_1/2 \leq \theta_2 \leq (\theta_1/2+45°)$.

20 Claims, 6 Drawing Sheets

(51) Int. Cl.
*H01M 10/0585* (2010.01)
*H01M 10/0587* (2010.01)
*H01M 50/414* (2021.01)
*H01M 50/449* (2021.01)
*H01M 50/457* (2021.01)
*H01M 50/46* (2021.01)

(52) U.S. Cl.
CPC ....... *H01M 50/414* (2021.01); *H01M 50/449* (2021.01); *H01M 50/461* (2021.01); *H01M 10/0585* (2013.01); *H01M 10/0587* (2013.01); *H01M 50/457* (2021.01)

(56) References Cited

U.S. PATENT DOCUMENTS

| 2021/0036375 | A1 | 2/2021 | Sato et al. |
| 2021/0242538 | A1 | 8/2021 | Lee et al. |
| 2023/0246246 | A1* | 8/2023 | Nowatari ............ H01M 10/052 429/94 |

FOREIGN PATENT DOCUMENTS

| CN | 108598338 A | 9/2018 |
| CN | 111092192 A | 5/2020 |
| CN | 111224047 A | 6/2020 |
| CN | 111670512 A | 9/2020 |
| CN | 112055899 A | 12/2020 |
| CN | 113206350 A | 8/2021 |
| CN | 113410581 A | 9/2021 |
| EP | 0849819 A2 | 6/1998 |
| KR | 10-2012-0127059 A | 11/2012 |
| KR | 20200036641 A | 4/2020 |

OTHER PUBLICATIONS

International Search Report dated Dec. 23, 2021, issued in counterpart International application No. PCT/CN2021/122859. (4 pages).
Office Action dated Aug. 20, 2024, issued in counterpart to CN Application No. 202110338853.6. (6 pages).
Extended (Supplementary) European Search Report dated Apr. 13, 2023, issued in counterpart EP Application No. 21870476.5. (7 pages).

* cited by examiner

ELECTROCHEMICAL DEVICE AND ELECTRONIC DEVICE

CROSS REFERENCE TO RELATED APPLICATION

The present application is a continuation application of PCT international application Ser. No. PCT/CN2021/122859, filed on Oct. 9, 2021, which claims the benefit of priority to the Chinese Patent Application Ser. No. 202110338853.6, filed on Mar. 30, 2021, the disclosures of which are hereby incorporated by reference in their entireties.

TECHNICAL FIELD

This application relates to the technical field of energy storage, and in particular, to an electrochemical device and an electronic device containing the electrochemical device.

BACKGROUND

Electrochemical devices (such as a battery) are widely used in electronic devices such as an electronic mobile device, an electric tool, and an electric vehicle. With the development of such electronic devices, people pose higher requirements on the cycle performance of the electrochemical devices.

SUMMARY

To overcome the foregoing disadvantages, it is necessary to provide an electrochemical device.

In addition, it is necessary to provide an electronic device containing the electrochemical device.

This application provides an electrochemical device, including a housing, an electrode assembly and an electrolytic solution, the electrode assembly and the electrolytic solution are disposed in the housing. The electrode assembly includes electrode plates and a separator disposed between adjacent electrode plates. The separator includes a porous substrate and a first bonding layer disposed on a surface of the porous substrate. The first bonding layer includes a plurality of first bonding regions spaced apart from each other. A thickness direction of the electrode assembly is defined as a first direction. In the first direction, a circumscribed rectangle of a projection of the electrode assembly possesses a diagonal line and a first side. An angle between the diagonal line and the first side is $\theta_1$. An angle between a projection of each of the plurality of first bonding regions and the first side is $\theta_2$, where $\theta_1/2 \leq \theta_2 \leq (\theta_1/2+45°)$.

The first bonding layer disposed on the separator according to this application includes a plurality of spaced first bonding regions to improve the interfacial adhesion between the separator and the electrode plate. In addition, a gap between two adjacent first bonding regions reserves a space for transmitting the electrolytic solution, thereby meeting the requirement of achieving a trade-off between the interfacial adhesion and the electrolyte transmission. Further, it is set that $\theta_1/2 \leq \theta_2 \leq (\theta_1/2+45°)$ in this application, so that the first bonding regions tilt against the first side of the circumscribed rectangle of the projection of the electrode assembly in the thickness direction. Therefore, the bonding force of the first bonding layer is continuously distributed in the direction of the first side, thereby increasing the deformation resistance of the electrochemical device. In addition, an appropriate relationship is set between $\theta_2$ and $\theta_1$, and therefore, a tilt angle of the first bonding regions deviates from a tilt angle of the diagonal line of the circumscribed rectangle by an amount that falls within a specified range. In this way, each first bonding region can form a relatively stable triangular fixing relationship with an end portion and a lateral portion of the electrode assembly, thereby further increasing the deformation resistance and cycle performance of the electrochemical device.

In some possible implementations, the separator further includes a second bonding layer. The porous substrate is located between the first bonding layer and the second bonding layer. The second bonding layer includes a plurality of second bonding regions spaced apart from each other. Therefore, a gap between two adjacent second bonding regions can also be used as a channel for transmitting the electrolytic solution, thereby further improving the performance of transmitting the electrolytic solution. In the first direction, an angle between a projection of each of the plurality of second bonding regions and the projection of each of the plurality of first bonding regions is $\theta_3$, where $0° < \theta_3 < 180°$. Therefore, the second bonding regions are also tilted, so that the bonding force of the second bonding layer is also continuously distributed in the direction of the first side, thereby further increasing the deformation resistance of the electrochemical device.

In some possible implementations, $\theta_3 = 180° - 2\theta_2$. With the relationship between $\theta_3$ and $\theta_2$ further defined in this way, the deformation resistance of the electrode assembly is further increase.

In some possible implementations, $\theta_2 = \theta_1$. It is further defined that $\theta_2$ is equal to $\theta_1$, so that each first bonding region can form the stablest triangular fixing relationship with a second end portion and the lateral portion of the electrode assembly, thereby further increasing the deformation resistance of the electrode assembly.

In some possible implementations, a direction from one of the first bonding regions to another adjacent first bonding region is defined as a second direction. In the second direction, a width of each of the plurality of first bonding regions is $d_1$ mm, a distance between adjacent two of the plurality of first bonding regions is $d_2$ mm, and $d_1$ and $d_2$ satisfy: $0.1 < d_1 < 10$, and $0.1 < d_2 < 10$. When $d_1$ is exceptionally small, the bonding force between the first bonding layer and the electrode plate is reduced, and the deformation resistance is reduced accordingly. When $d_1$ is exceptionally large, $d_2$ is reduced accordingly, and the space available for transmitting the electrolytic solution is reduced, thereby deteriorating infiltration of the electrolytic solution. When $d_2$ is exceptionally small, the space available for transmitting the electrolytic solution is also reduced, thereby deteriorating infiltration of the electrolytic solution. When $d_2$ is exceptionally large, $d_1$ is reduced accordingly, thereby also reducing the bonding force between the first bonding layer and the electrode plate and reducing the deformation resistance accordingly.

In some possible implementations, a direction from one of the first bonding regions to another adjacent first bonding region is defined as a second direction. In the second direction, a width of the first bonding region is $d_1$ mm, a distance between the adjacent first bonding regions is $d_2$ mm, and $d_1$ and $d_2$ satisfy: $0.1 < d_1/d_2 < 5$. When $d_1/d_2$ is exceptionally small, the proportion of the area of the first bonding regions is reduced, thereby also reducing the bonding force between the first bonding layer and the electrode plate, and reducing the deformation resistance accordingly. When $d_1/d_2$ is exceptionally large, the proportion of the area of the first bonding regions is increased, thereby also reducing the space available for transmitting the electrolytic solution and deteriorating infiltration of the electrolytic solution.

In some possible implementations, in the first direction, a thickness of the first bonding layer is $t_1$ µm, and $0.15 < t_1 d_1 / (d_1 + d_2) < 2$. When $t_1 d_1 / (d_1 + d_2)$ is exceptionally small, the proportion of a diffusion area of the first bonding layer softened by heating is reduced, thereby also reducing the bonding force between the first bonding layer and the electrode plate, and reducing the deformation resistance accordingly. When $t_1 d_1 / (d_1 + d_2)$ is exceptionally large, the proportion of the diffusion area of the first bonding layer softened by heating is increased, thereby also reducing the space available for transmitting the electrolytic solution and deteriorating infiltration of the electrolytic solution.

In some possible implementations, in the first direction, the thickness of the first bonding layer is $t_1$ µm, and $0.1 \le t_1 \le 6$. When $t_1$ is exceptionally small, the bonding force between the first bonding layer and the electrode plate is reduced. When $t_1$ is exceptionally large, thereby reducing overall air permeability of the separator and resulting in poor transmission of the electrolytic solution.

In some possible implementations, the plurality of the first bonding regions are parallel to each other. When the plurality of first bonding regions are parallel to each other, an angle may exist between two adjacent first bonding regions, where the angle is −5° to +5°.

In some possible implementations, each of the plurality of first bonding regions is continuous or discontinuous. Gaps between different sections of each discontinuous first bonding region may also be used as a channel for transmitting the electrolytic solution, thereby further improving the performance of transmitting the electrolytic solution.

In some possible implementations, in the first direction, shapes of the projection of the electrode assembly include a rectangle, an arc, or an L shape. Therefore, the electrochemical device can fit with the shape of the internal space of the electronic device, so as to make full use of the space in the electronic device and increase the capacity of the electrochemical device.

In some possible implementations, the electrode assembly further includes tabs electrically connected to the electrode plates. Projections of the tabs in the first direction connect to an opposite side of the first side, so that the tabs can be connected to an external component conveniently.

In some possible implementations, structures of the electrode assembly include a wound structure or a stacked structure.

In some possible implementations, the porous substrate includes a polymer film, a multilayer polymer film, or a non-woven fabric, which, in each case, is formed by at least one of polyolefin, polyvinylidene difluoride, polyethylene terephthalate, cellulose, polyimide, polyamide, spandex, or polyphthalamide. Such polymers are of high thermal stability and make it easy to coat the porous substrate with the first bonding layer. In addition, the polymers are flexible and easily bendable.

In some possible implementations, the first bonding layer includes a bonding material. The bonding material includes at least one of poly(vinylidene difluoride-co-hexafluoropropylene), poly(vinylidene difluoride-co-trichloroethylene), polymethyl methacrylate, polyacrylic acid, polyacrylic acid sodium salt, polyacrylonitrile, polyvinylpyrrolidone, polyvinyl acetate, poly(ethylene-co-vinyl acetate), polyimide, polyethylene oxide, cellulose acetate, cellulose acetate butyrate, cellulose acetate propionate, cyanoethyl pullulan, cyanoethyl polyvinyl alcohol, cyanoethyl cellulose, cyanoethyl sucrose, pullulan, sodium carboxymethyl cellulose, lithium carboxymethyl cellulose, poly(acrylonitrile-co-styrene-co-butadiene), polyvinyl alcohol, polyvinyl ether, polytetrafluoroethylene, polyhexafluoropropylene, poly(styrene-co-butadiene), or polyvinylidene difluoride. Such polymers exert a strong bonding effect to bond the separator and the electrode plate together.

This application further provides an electronic device, including the electrochemical device described above.

REFERENCE NUMERALS OF MAIN COMPONENTS

Electronic device 1
Housing 10
Body portion 11
Flank 12
Electrode assembly 20
First electrode plate 21
Second electrode plate 22
Separator 23
First tab 30
Second tab 40
Electrochemical device 100
Top surface 111
Bottom surface 112
Upper surface 113
First lateral surface 114
Second lateral surface 115
Projection of the electrode assembly 200
First side 201
Second side 202
Diagonal line 203
First current collector 211
First active material layer 212
Second current collector 221
Second active material layer 222

Porous substrate 230
First bonding layer 231
Second bonding layer 232
First bonding region 2311
Second bonding region 2321
Circumscribed rectangle R
Gaps $G_1$, $G_2$, $G_3$
First direction $D_1$
Second direction $D_2$
Third direction $D_3$
Fourth direction $D_4$
Width $d_1$
Distance $d_2$
Thickness $t_1$ This application is further described below with reference to the following specific embodiments and the foregoing drawings.

DETAILED DESCRIPTION

The following describes the technical solutions in the embodiments of this application clearly and thoroughly with reference to the drawings herein. Evidently, the described embodiments are merely a part of but not all of the embodiments of this application.

Unless otherwise defined, all technical and scientific terms used herein have the same meanings as usually understood by a person skilled in the technical field of this application. The terms used in the specification of this application herein are merely intended for describing specific embodiments but are not intended to limit this application.

The following describes some embodiments of this application in detail with reference to drawings. To the extent that no conflict occurs, the following embodiments and the features in the embodiments may be combined with each other.

An electrochemical device generally includes electrode plates and a separator disposed between adjacent electrode plates. Generally, a separator of high bonding performance is used so that the adjacent electrode plates and the separator are bonded firmly together to ensure high interfacial adhesion between the separator and the electrode plates, and to suppress expansion deformation caused by gassing inside the electrochemical device. However, the separator of high bonding performance makes interstices smaller between the separator and the electrode plate, and makes the electrode plate hardly permeable by the electrolytic solution. Especially, for a wound battery, uneven distribution of the electrolytic solution is more prone to occur at a corner region of the electrode assembly, thereby leading to purple-speck lithium plating during cycles and impairing the cycle performance of the electrochemical device.

Figure 1:
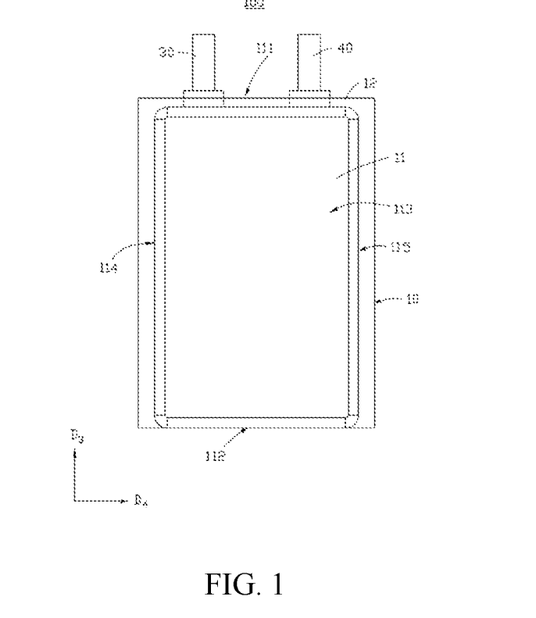
FIG. 1 is an overall schematic structural diagram of an electrochemical device according to an embodiment of this application.

Referring to FIG. 1, an embodiment of this application provides an electrochemical device 100, including a housing 10, an electrode assembly 20 (shown in FIG. 5 and FIG. 6), an electrolytic solution, a first tab 30 and a second tab 40. The electrode assembly 20 and the electrolytic solution are accommodated in the housing 10. The electrochemical device 100 shown in FIG. 5 and FIG. 6 includes one electrode assembly 20. However, understandably, in order to achieve a high-voltage output, the electrochemical device 100 may include a plurality of electrode assemblies 20 connected in series instead, without being limited in this application.

Figure 5:
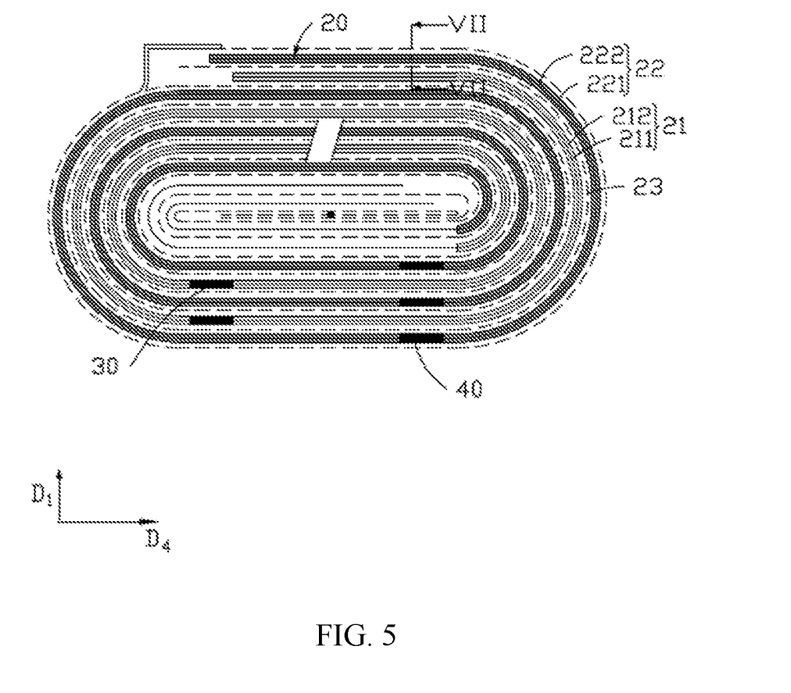
FIG. 5 is a top view of the electrode assembly shown in FIG. 2 according to some embodiments.
Figure 6:
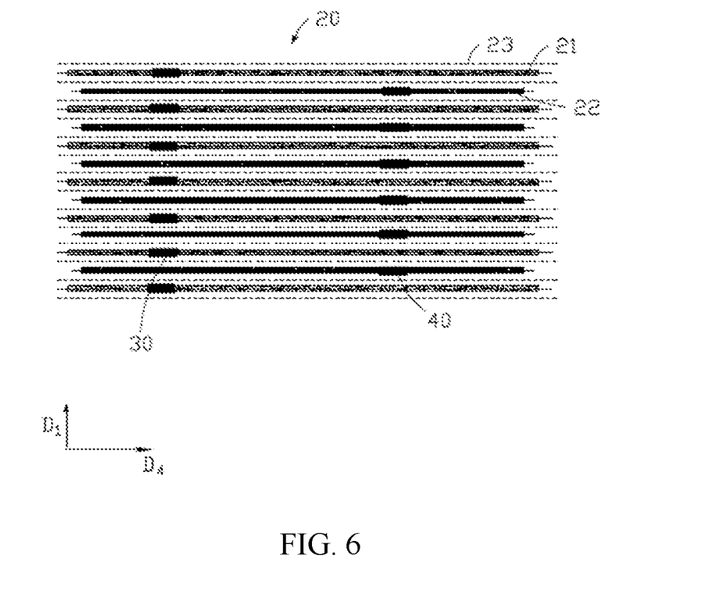
FIG. 6 is a top view of the electrode assembly shown in FIG. 2 according to some other embodiments.

As shown in FIG. 5 and FIG. 6, the electrode assembly 20 includes electrode plates and a separator 23 disposed between adjacent electrode plates. The electrode plates include a first electrode plate 21 and a second electrode plate 22. The separator 23 is disposed between the first electrode plate 21 and the second electrode plate 22. The separator 23 is configured to prevent direct contact between the first electrode plate 21 and the second electrode plate 22, where the direct contact may cause a short circuit. In some embodiments, the electrode assembly 20 is obtained by winding the first electrode plate 21, the separator, and the second electrode plate 22. In other words, the electrode assembly 20 is a wound structure. In some other embodiments, the electrode assembly 20 may be obtained by stacking the first electrode plate 21, the separator, and the second electrode plate 22. In other words, the electrode assembly 20 is a stacked structure.

The first tab 30 and the second tab 40 are electrically connected to the electrode assembly 20, respectively, and protrude from the housing 10 to connect to an external component (not shown in the drawing). Specifically, the first electrode plate 21 includes a first current collector 211 and a first active material layer 212 disposed on a surface of the first current collector 211. The first tab 30 is electrically connected to the first current collector 211. The second electrode plate 22 includes a second current collector 221 and a second active material layer 222 disposed on a surface of the second current collector 221. The second tab 40 is electrically connected to the second current collector 221. In some embodiments, the first electrode plate 21 is a positive electrode plate, and the second electrode plate 22 is a negative electrode plate.

As shown in FIG. 1, the housing 10 may be a packaging bag obtained by sealing with a sealing film. In other words, the electrochemical device 100 may be a pouch-type battery. In this case, the housing 10 includes a body portion 11 and a sealing portion 12. The body portion 11 is configured to accommodate the electrode assembly 20 and the electrolytic solution. The sealing portion 12 is connected to the body portion 11. The first tab 30 and the second tab 40 protrude out of the sealing portion 12. The body portion 11 includes a top surface 111, a bottom surface 112, an upper surface 113, a lower surface (not shown), a first lateral surface 114, and a second lateral surface 115. The top surface 111 is opposite to the bottom surface 112. The upper surface 113 is opposite to the lower surface, and is connected between the top surface 111 and the bottom surface 112. The first lateral surface 114 is opposite to the second lateral surface 115, and is connected between the top surface 111 and the bottom surface 112. The sealing portion 12 is connected to the top surface 111. In other embodiments, without being limited to a pouch-type battery, the electrochemical device 100 may be a steel- or aluminum-shell battery or the like instead. The type of the electrochemical device is not limited in this application.

Figure 7:
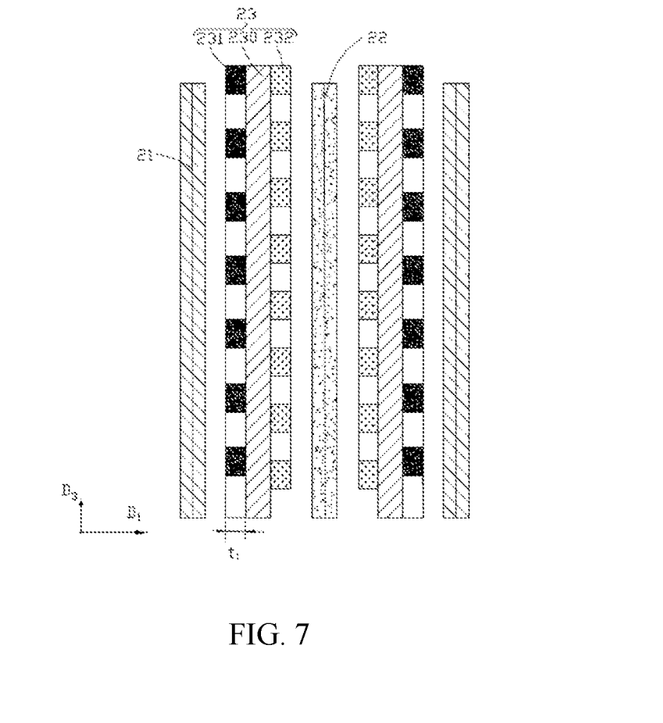
FIG. 7 is a sectional view of the electrode assembly shown in FIG. 5 and sectioned along a VII-VII line.

Referring to FIG. 7, the separator 23 includes a porous substrate 230 and a first bonding layer 231 disposed on a surface of the porous substrate 230. The first bonding layer 231 bonds with the first electrode plate 21. In another embodiment, the first bonding layer 231 may bond with the second electrode plate 22 instead.

Figure 8:
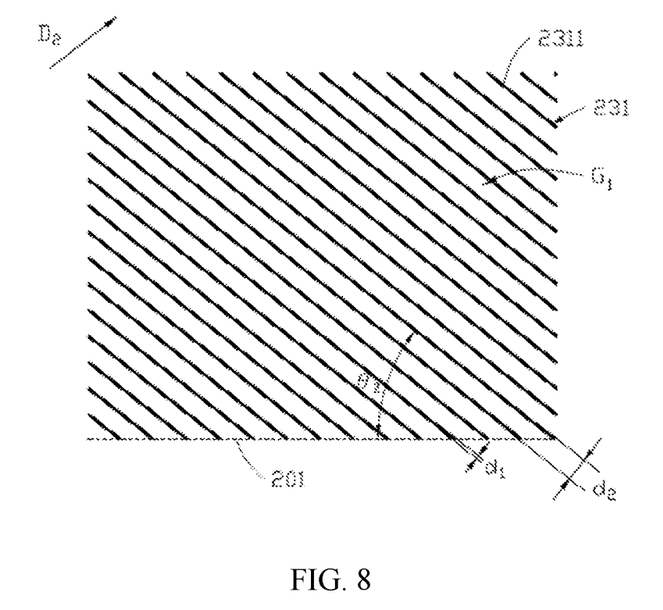
FIG. 8 is a front view of a separator of the electrode assembly shown in FIG. 2 according to some embodiments.

Referring to FIG. 8, the first bonding layer 231 includes a plurality of first bonding regions 2311 spaced apart from each other. In other words, adjacent two of the plurality of first bonding regions 2311 are interspaced with a gap $G_1$. In some embodiments, the plurality of first bonding regions 2311 are parallel to each other. Understandably, when two components are referred to as being parallel to each other, the two components are not necessarily parallel to each other exactly, but an angle may exist between the two components, where the angle is −5° to +5°.

Figure 2:
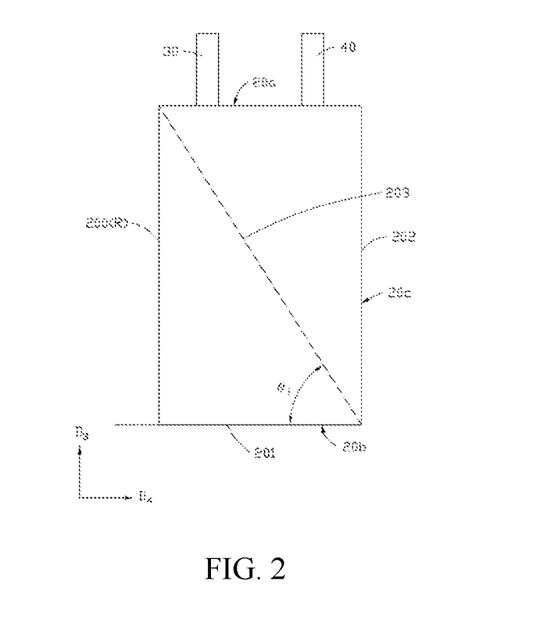
FIG. 2 is a front view of an electrode assembly of the electrochemical device shown in FIG. 1 according to some embodiments.

It is defined that the thickness direction (that is, the direction from the upper surface 113 to the lower surface), the length direction (that is, the direction from the bottom surface 112 to the top surface 111), and the width direction (that is, the direction from the first lateral surface 114 to the second lateral surface 115) of the electrode assembly 20 are a first direction $D_1$, a third direction $D_3$, and a fourth direction $D_4$, respectively. The third direction $D_3$ is the direction in which the first tab 30 and the second tab 40 protrude. Referring to FIG. 2, in some embodiments, in the first direction $D_1$, the projection 200 of the electrode assembly 20 is rectangular, and possesses a first side 201, a second side 202, and a diagonal line 203 connected to both the first side 201 and the second side 202.

As shown in FIG. 2, the electrode assembly 20 possesses a first end portion 20a, a second end portion 20b, and a lateral portion 20c connected between the first end portion 20a and the second end portion 20b. The first end portion 20a is a head of the electrode assembly 20, and is a portion at which the first tab 30 and the second tab 40 are disposed. The second end portion 20b is an ending of the electrode assembly 20, where the ending is opposite to the head. The projection of the second end portion 20b in the first direction $D_1$ forms the first side 201. The projection of the lateral portion 20c in the first direction $D_1$ forms the second side 202. In this case, the projections of the first tab 30 and the second tab 40 in the first direction $D_1$ connect to the opposite side of the first side 201, so that the first tab 30 and the second tab 40 can be electrically connected to an external component conveniently.

Referring to FIG. 2 and FIG. 8, it is defined that an angle between the diagonal line 203 and the first side 201 is $\theta_1$. The diagonal line 203 of the circumscribed rectangle R tilts against the first side 201, and therefore, $0°<\theta_1<90°$. The angle between the projection of each of the plurality of first bonding regions 2311 and the first side 201 is $\theta_2$. $\theta_1$ and $\theta_2$ satisfy: $\theta_1/2 \leq \theta_2 \leq (\theta_1/2+45°)$.

Figure 9:
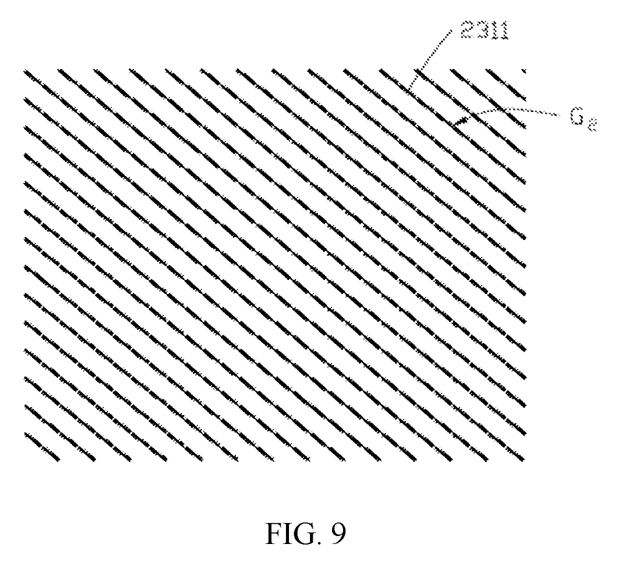
FIG. 9 is a front view of a separator of the electrode assembly shown in FIG. 2 according to some other embodiments.

As shown in FIG. 8, in some embodiments, each first bonding region 2311 may be strip-shaped and disposed on the surface of the porous substrate 230. That is, each of the plurality of first bonding regions 2311 is continuous. In this case, the projection of each of the plurality of first bonding regions 2311 is also strip-shaped. The angle $\theta_2$ between the projection of each of the plurality of first bonding regions 2311 and the first side 201 is the angle between the strip-shaped projection and the first side 201. As shown in FIG. 9, in another embodiment, each of the plurality of first bonding regions 2311 may be discontinuous instead, for example, may be disposed on the surface of the porous substrate 230 in shapes of a plurality of blocks or islands. In this case, the projection of each of the plurality of first bonding regions 2311 is also in the shape of a plurality of blocks or islands. The angle $\theta_2$ between the projection of each of the plurality of first bonding regions 2311 and the first side 201 is the angle between a connection line of the projections of the blocks or islands and the first side 201.

Gaps $G_2$ also exist between sections of each discontinuous first bonding region 2311, and can be used as a channel for transmitting the electrolytic solution, thereby further improving the performance of transmitting the electrolytic solution.

The first bonding layer 231 disposed on the separator according to this application includes a plurality of spaced first bonding regions 2311. The plurality of first bonding regions 2311 can bond with the first electrode plate 21 or the second electrode plate 22, so as to improve the interfacial adhesion between the separator 23 and the electrode plate and suppress the expansion deformation caused by the gassing inside the electrochemical device 100. This increases the deformation resistance of the electrochemical device 100, reduces the hazards of deformation and structural disruption of the electrode assembly, and keeps smoothness of the entire conductive network in the electrode assembly 20, thereby improving the cycle performance of the electrochemical device 100. A gap $G_1$ exists between adjacent two of the plurality of first bonding regions 2311 to reserve a space for transmitting the electrolytic solution. After the electrolytic solution is injected, the electrolytic solution can flow through the gap $G_1$ and infiltrate the electrode plate thoroughly, thereby also helping to improve the cycle performance of the electrochemical device 100. The electrochemical device 100 according to this application achieves a trade-off between interfacial adhesion and the required capability of transmitting the electrolytic solution.

Further, in this application, it is set that $\theta_1/2 \leq \theta_2 \leq (\theta_1/2+45°)$. $0°<\theta_1<90°$, and therefore, $0°<\theta2<90°$, thereby causing the projections of the first bonding regions 2311 to also tilt against the first side 201. Therefore, the bonding force of the first bonding layer 231 is continuously distributed in the direction of the first side 201. That is, the bonding force between the separator 23 and the electrode plate is continuously distributed in the direction of the first side 201, thereby increasing the deformation resistance of the electrochemical device 100 and improving the cycle performance. In addition, an appropriate relationship is set between $\theta_2$ and $\theta_1$, and therefore, a tilt angle of the first bonding regions 2311 deviates from a tilt angle of the diagonal line 203 of the circumscribed rectangle R by an amount that falls within a specified range. Therefore, each first bonding region 2311 can form a relatively stable triangular fixing relationship with the second end portion 20b and the lateral portion 20c of the electrode assembly 20, thereby further increasing the deformation resistance of the electrochemical device 100 and improving the cycle performance.

Figure 3:
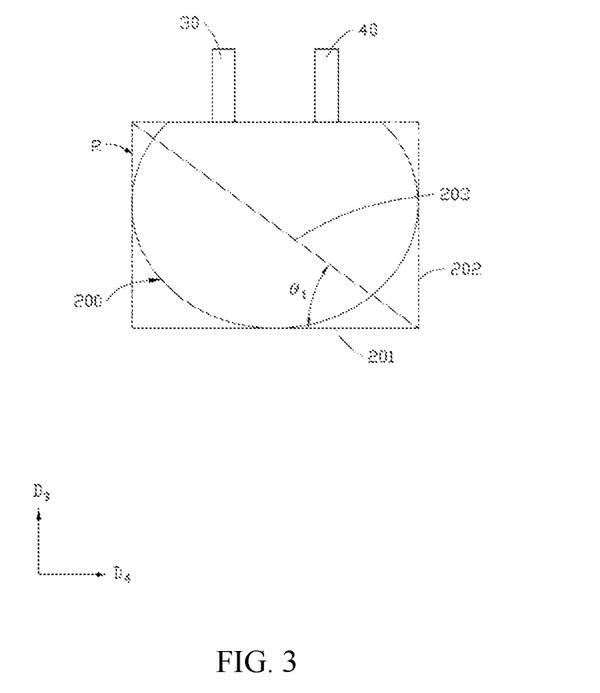
FIG. 3 is a front view of an electrode assembly of the electrochemical device shown in FIG. 1 according to some other embodiments.
Figure 4:
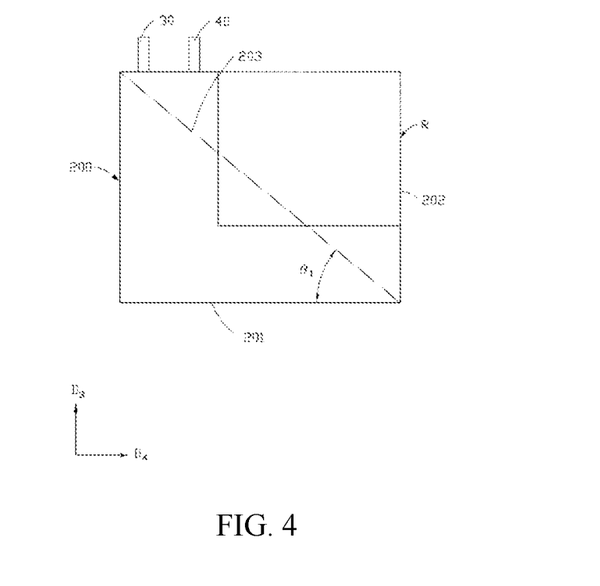
FIG. 4 is a front view of an electrode assembly of the electrochemical device shown in FIG. 1 according to still other embodiments.

Understandably, in order to improve the competitiveness of electronic devices, some consumer electronic devices are changing toward irregular shapes. An electrochemical device in an irregular shape can make full use of the irregular space in such electronic devices, thereby increasing the capacity of the entire electrochemical device. Therefore, in this application, in the first direction $D_1$, the shape of the projection 200 of the electrode assembly 20 is not limited to a rectangle, and may be other irregular shapes instead. As shown in FIG. 3 and FIG. 4, in another embodiment, when the electrode assembly 20 is a stacked structure, shapes of the projection 200 of the electrode assembly 20 in the first direction $D_1$ include an arc or an L shape. In this case, the circumscribed rectangle R of the projection 200 of the electrode assembly 20 also possesses a first side 201, a second side 202, and a diagonal line 203 connected between the first side 201 and the second side 202. Understandably, as shown in FIG. 2, when the projection 200 of the electrode assembly 20 is rectangular, the circumscribed rectangle R of the projection 200 is the projection 200 itself.

In some embodiments, the porous substrate 230 includes a polymer film, a multilayer polymer film, or a non-woven fabric, which, in each case, is formed by at least one of polyolefin, polyvinylidene difluoride, polyethylene terephthalate, cellulose, polyimide, polyamide, spandex, or polyphthalamide. Such polymers possess high thermal stability, and facilitate surface treatment, thereby making it easy to coat the porous substrate 230 with the first bonding layer 231. In addition, such polymers are highly flexible and bendable.

The first bonding layer 231 includes a bonding material. The bonding material includes at least one of the following polymers: poly(vinylidene difluoride-co-hexafluoropropylene), poly(vinylidene difluoride-co-trichloroethylene), polymethyl methacrylate, polyacrylic acid, polyacrylic acid sodium salt, polyacrylonitrile, polyvinylpyrrolidone, polyvinyl acetate, poly(ethylene-co-vinyl acetate), polyimide, polyethylene oxide, cellulose acetate, cellulose acetate butyrate, cellulose acetate propionate, cyanoethyl pullulan, cyanoethyl polyvinyl alcohol, cyanoethyl cellulose, cyanoethyl sucrose, pullulan, sodium carboxymethyl cellulose, lithium carboxymethyl cellulose, poly(acrylonitrile-co-styrene-co-butadiene), polyvinyl alcohol, polyvinyl ether, polytetrafluoroethylene, polyhexafluoropropylene, poly(styrene-co-butadiene), or polyvinylidene difluoride. Such polymers exert a strong bonding effect to bond the separator 23 and the first electrode plate 21 or the second electrode plate 22 together.

Figure 10:
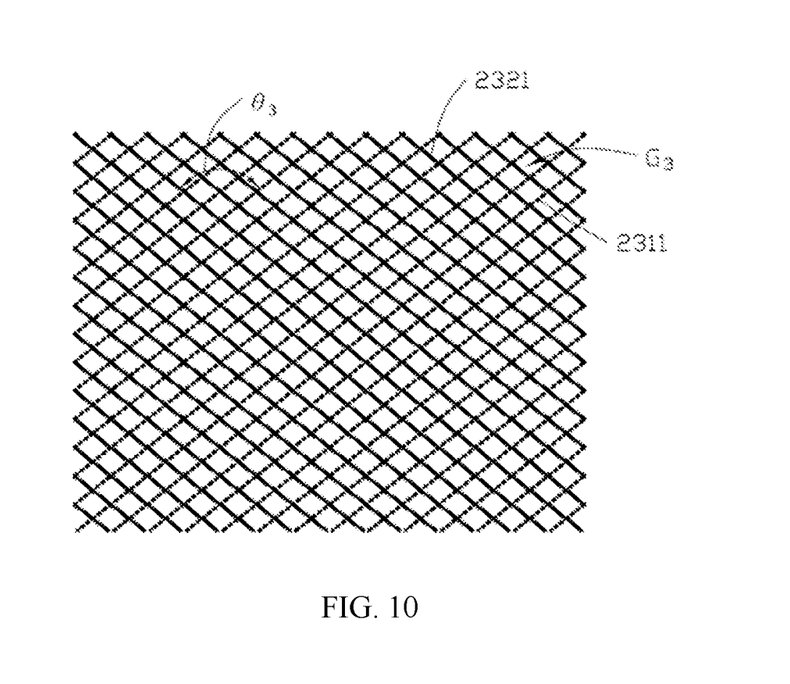
FIG. 10 is a rear view of a separator of the electrode assembly shown in FIG. 2.

As shown in FIG. 7, in some embodiments, the separator 23 further includes a second bonding layer 232. The porous substrate 230 is located between the first bonding layer 231 and the second bonding layer 232. When the first bonding layer 231 bonds with the first electrode plate 21, the second bonding layer 232 bonds with the second electrode plate 22. Referring to FIG. 10, the second bonding layer 232 includes a plurality of second bonding regions 2321 spaced apart from each other. In other words, two adjacent second bonding regions 2321 are also interspaced with a gap $G_3$ that serves as a channel for transmitting the electrolytic solution. Therefore, the second bonding regions 2321 disposed herein further improve the infiltration effect of the electrolytic solution. In some embodiments, a plurality of second bonding regions 2321 are parallel to each other.

In the first direction $D_1$, an angle between the projection 200 of the second bonding regions 2321 and the projection 200 of the first bonding regions 2311 is $\theta_3$, where $0°<\theta_3<180°$. In other words, the second bonding regions 2321 also tilt against the first side 201. Therefore, the bonding force of the second bonding layer 232 is also continuously distributed in the direction of the first side 201, thereby further increasing the deformation resistance of the electrochemical device 100.

Further, $\theta_2$ and $\theta_3$ may further satisfy: $\theta_3=180°-2\theta_2$. With the relationship between $\theta_3$ and $\theta_2$ further defined in this way, the deformation resistance of the electrode assembly 20 is further increased.

In some embodiments, $\theta_2=\theta_1$. It is further defined that $\theta_2$ is equal to $\theta_1$, so that each first bonding region 2311 can form the stablest triangular fixing relationship with a second end portion 20b and the lateral portion 20c of the electrode assembly 20, thereby further increasing the deformation resistance of the electrode assembly 20.

As shown in FIG. 8, in some embodiments, a direction from one of the first bonding regions 2311 to another adjacent first bonding region 2311 is defined as a second direction $D_2$. In the second direction $D_2$, a width of the first bonding region 2311 is $d_1$ mm, a distance between the adjacent first bonding regions 2311 is $d_2$ mm, and $d_1$ and $d_2$ satisfy: $0.1<d_1<10$, and $0.1<dz<10$. When $d_1$ is exceptionally small, the bonding force between the first bonding layer 231 and the electrode plate is reduced, and the deformation resistance is reduced accordingly. When $d_1$ is exceptionally large, $d_2$ is reduced accordingly on condition that the area of the electrode plate is constant, and the space available for transmitting the electrolytic solution is reduced, thereby deteriorating infiltration of the electrolytic solution. When $d_2$ is exceptionally small, the space available for transmitting the electrolytic solution is also reduced, thereby deteriorating infiltration of the electrolytic solution. When $d_2$ is exceptionally large, $d_1$ is reduced accordingly on condition that the area of the electrode plate is constant, thereby also reducing the bonding force between the first bonding layer 231 and the electrode plate and reducing the deformation resistance accordingly.

In some embodiments, $d_1$ and $d_2$ satisfy: $0.1<d_1/d_2<5$. When $d_1/d_2$ is exceptionally small, the proportion of the area of the first bonding regions 2311 is reduced, thereby also reducing the bonding force between the first bonding layer 231 and the electrode plate, and reducing the deformation resistance accordingly. When $d_1/d_2$ is exceptionally large, the proportion of the area of the first bonding regions 2311 is increased, thereby also reducing the space available for transmitting the electrolytic solution and deteriorating infiltration of the electrolytic solution.

In some embodiments, in the first direction $D_1$, a thickness of the first bonding layer 231 is $t_1$ μm, and $0.15<t_1d_1/(d_1+d_2)<2$. When $t_1d_1/(d_1+d_2)$ is exceptionally small, the proportion of a diffusion area of the first bonding layer 231 softened by heating is reduced, thereby also reducing the bonding force between the first bonding layer 231 and the electrode plate, and reducing the deformation resistance accordingly. When $t_1d_1/(d_1+d_2)$ is exceptionally large, the proportion of the diffusion area of the first bonding layer 231 softened by heating is increased, thereby also reducing the space available for transmitting the electrolytic solution and deteriorating infiltration of the electrolytic solution.

Referring to FIG. 7 and FIG. 8, in some embodiments, $0.1 \leq t_1 \leq 6$. When $t_1$ is exceptionally small, the bonding force between the first bonding layer 231 and the electrode plate is reduced. When $t_1$ is exceptionally large, thereby reducing overall air permeability of the separator 23 and resulting in poor transmission of the electrolytic solution.

In this application, the electrochemical device 100 may be any type of primary batteries, secondary batteries, fuel cells, solar cells, and capacitors (such as supercapacitors). Especially, the secondary battery may be a lithium secondary battery, including a lithium metal secondary battery, a lithium-ion secondary battery, a lithium polymer secondary battery, and a lithium-ion polymer secondary battery.

Figure 11:
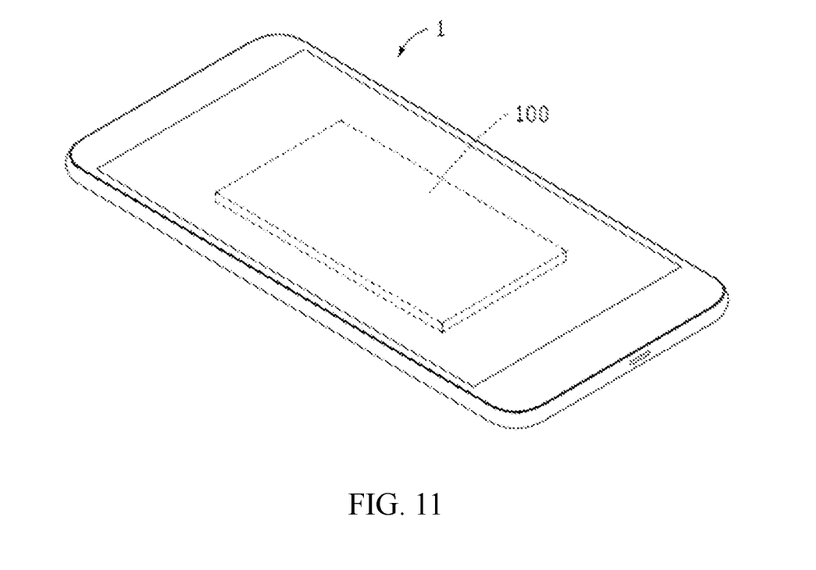
FIG. 11 is a schematic structural diagram of an electronic device according to an embodiment of this application.

Referring to FIG. 11, an embodiment of this application further provides an electronic device 1. The electronic device 1 includes the electrochemical device 100 disclosed above. The electronic device 1 according to this application may be, but is not limited to: a notebook computer, a pen-inputting computer, a mobile computer, an e-book player, a portable phone, a portable fax machine, a portable photocopier, a portable printer, a stereo headset, a video recorder, a liquid crystal display television set, a handheld cleaner, a portable CD player, a mini CD-ROM, a transceiver, an electronic notepad, a calculator, a memory card, a portable voice recorder, a radio, a backup power supply, a motor, a car, a motorcycle, a power-assisted bicycle, a bicycle, a lighting appliance, a toy, a game machine, a watch, an electric tool, a flashlight, a camera, a large household battery, a lithium-ion capacitor, and the like.

The following describes this application in detail with reference to specific embodiments and comparative embodiments. This application is described below with reference to a specific preparation process and a test method using a pouch-type cell as an example of the electrochemical device. A person skilled in the art understands that the preparation method described in this application is merely an example. Any other appropriate preparation methods fall within the scope of this application.

Comparative Embodiment 1

The separator is coated on both sides with a first bonding layer and a second bonding layer. The electrode assembly is obtained by sequentially stacking and winding the first electrode plate, the second electrode plate, and the separator. In the first direction, a projection of the electrode assembly is rectangular. An angle $\theta_1$ between a diagonal line of the projection and the first side is 45°. An angle $\theta_2$ between a projection of first bonding regions of the first bonding layer and the first side is 90°. An angle $\theta_3$ between a projection of second bonding regions of the second bonding layer and the projection of the first bonding regions is 23°. A width $d_1$ of each of the first bonding regions is 0.21 mm, a distance $d_2$ between adjacent first bonding regions is 0.04 mm, and the thickness $t_1$ of the first bonding region is 2 µm.

The electrode assembly and the electrolytic solution are packaged into an aluminum plastic film to obtain an electrochemical device.

Comparative Embodiments 2 to 5 and Embodiments 1 to 12

Differences from Comparative Embodiment 1 are: the value of $\theta_1$, $\theta_2$, or $\theta_3$ is different; the second bonding layer is omitted in the separator; or, the first bonding layer and the second bonding layer are evenly applied as coating (that is, the entire surface of the porous substrate is evenly coated with the bonding layers).

A capacity retention rate test and a three-point bending test are performed on the electrochemical device in each embodiment and each comparative embodiment, and the corresponding test results are recorded in Table 1. The steps of the capacity retention rate test include: charging the electrochemical device at a constant current of 1 C in a 45° C. muffle oven until the voltage reaches 4.43 V, then charging the electrochemical device at a constant voltage until the current reaches 0.05 C, then leaving the electrochemical device to stand for 5 minutes; and then discharging the electrochemical device at a current of 0.7 C until the voltage reaches 3.0 V, whereupon the discharge capacity is a first-cycle discharge capacity of the electrochemical device, recorded as 100%. The foregoing charging and discharging steps are repeated for 400 cycles separately. A ratio of the discharge capacity of the electrochemical device at the end of the cycles to the first-cycle discharge capacity, multiplied by 100%, is the capacity retention rate.

The steps of the three-point bending test include: fixing the electrochemical device onto two supporting points that are a distance apart from each other in a dry environment, and using an indenter to apply a pressure to the electrochemical device at a midpoint of the two supporting points; and then recording a displacement by which the electrochemical device is pressed downward with the indenter, and the pressure that is withstood by the electrochemical device and that corresponds to the displacement. When the recorded pressure value jumps (plunges), it indicates that the electrochemical device is fractured inside. The pressure value at this time may be used to represent the hardness of the electrochemical device.

TABLE 1

| | $\theta_1$ (°) | $\theta_2$ (°) | $\theta_3$ (°) | 400th-cycle capacity retention rate (%) | Three-point bending pressure (N) |
|---|---|---|---|---|---|
| Comparative Embodiment 1 | 45 | 90 | 23 | 67 | 170 |
| Comparative Embodiment 2 | 45 | 90 | 30 | 65 | 167 |
| Comparative Embodiment 3 | 45 | 90 | 45 | 67 | 165 |
| Comparative Embodiment 4 | 45 | 90 | 90 | 68 | 180 |
| Comparative Embodiment 5 | 45 | Coated evenly | Coated evenly | 70 | 190 |
| Embodiment 1 | 45 | 45 | 23 | 81 | 181 |
| Embodiment 2 | 45 | 45 | 30 | 83 | 183 |
| Embodiment 3 | 45 | 45 | 45 | 86 | 188 |
| Embodiment 4 | 45 | 45 | 90 | 92 | 192 |
| Embodiment 5 | 45 | 45 | 120 | 87 | 190 |
| Embodiment 6 | 45 | 45 | 160 | 80 | 183 |
| Embodiment 7 | 45 | 20 | 140 | 81 | 185 |
| Embodiment 8 | 45 | 50 | 80 | 83 | 190 |
| Embodiment 9 | 45 | 75 | 30 | 82 | 184 |
| Embodiment 10 | 62 | 45 | 90 | 78 | 181 |
| Embodiment 11 | 62 | 62 | 90 | 88 | 190 |
| Embodiment 12 | 62 | 62 | 56 | 94 | 196 |

As can be seen from the data in Table 1, compared with Comparative Embodiments 1 to 4, the electrochemical devices in Embodiments 1 to 4 possess relatively high hardness (that is, high deformation resistance) and an improved capacity retention rate because Embodiments 1 to 4 satisfy $\theta_1/2 \leq \theta_2 \leq (\theta_1/2+45°)$. The electrochemical device in Embodiment 4 achieves even a higher deformation resistance and a higher capacity retention rate due to $\theta_2=\theta_1$. The electrochemical device in Comparative Embodiment 5 achieves the lowest cycle performance because the separator is coated evenly with the bonding layer.

Further, as can be seen from comparison between Embodiments 1 to 6, when $\theta_1/2 \leq \theta_2 \leq (\theta_1/2+45°)$, as $\theta_3$ increases, the deformation resistance and the capacity retention rate of the electrochemical device show a tendency to increase first and then decrease. When $\theta_3=180°-2\theta_2$, the electrochemical device achieves a higher deformation resistance and a higher capacity retention rate. Therefore, the electrochemical device in Embodiment 4 possesses even a higher deformation resistance and a higher capacity retention rate.

Still further, as can be seen from comparison between Embodiments 4 and 7 to 10, when $\theta_3=180°-2\theta_2$, as $\theta_2$ increases, the deformation resistance and the capacity retention rate of the electrochemical device show a tendency to increase first and then decrease. When $\theta_2=\theta_1$, the electrochemical device achieves even a higher deformation resistance and a higher capacity retention rate. Therefore, the electrochemical device in Embodiment 4 possesses even a higher deformation resistance and a higher capacity retention rate.

Moreover, when $\theta_2=\theta_1$, the specific value of $\theta_1$ is adjustable. In contrast with Embodiment 10, the electrochemical devices in Embodiments 11 to 12 achieve even a higher deformation resistance and a higher capacity retention rate due to $\theta_2=\theta_1$.

Embodiments 13 to 26

Differences from Embodiment 1 are that the values of $t_1$, $d_1$, and $d_2$ are further set, and the value of $t_1$, $d_1$, or $d_2$ varies in Embodiments 13 to 26.

A capacity retention rate test and a three-point bending test are performed on the electrochemical device in each embodiment and each comparative embodiment, and the corresponding test results are recorded in Table 2.

TABLE 2

| | $d_1$ (mm) | $d_2$ (mm) | $t_1$ (μm) | $d_1/d_2$ | $t_1d_1/(d_1 + d_2)$ | $400^{th}$-cycle capacity retention rate | Three-point bending pressure (N) |
|---|---|---|---|---|---|---|---|
| Embodiment 13 | 0.21 | 0.04 | 2 | 5.25 | 1.68 | 70.2 | 193 |
| Embodiment 14 | 0.21 | 0.06 | 2 | 3.5 | 1.56 | 80.4 | 189 |
| Embodiment 15 | 0.21 | 0.12 | 2 | 1.79 | 1.28 | 88.4 | 185 |
| Embodiment 16 | 0.21 | 0.31 | 2 | 0.679 | 0.81 | 85.5 | 170 |
| Embodiment 17 | 0.21 | 2.2 | 2 | 0.095 | 0.17 | 84 | 150 |
| Embodiment 18 | 0.21 | 12 | 2 | 0.018 | 0.03 | 78.7 | 130 |
| Embodiment 19 | 0.52 | 0.31 | 2 | 1.682 | 1.25 | 87.4 | 185 |
| Embodiment 20 | 0.83 | 0.31 | 2 | 2.684 | 1.46 | 90.4 | 188 |
| Embodiment 21 | 4.02 | 0.31 | 2 | 13.002 | 1.86 | 70.2 | 192 |
| Embodiment 22 | 12 | 12 | 2 | 1 | 1 | 80.1 | 167 |
| Embodiment 23 | 0.52 | 0.31 | 0.5 | 1.682 | 0.31 | 80.2 | 163 |
| Embodiment 24 | 0.52 | 0.31 | 2.4 | 1.682 | 1.51 | 88.3 | 181 |
| Embodiment 25 | 0.52 | 0.31 | 5.6 | 1.682 | 3.51 | 75.9 | 191 |
| Embodiment 26 | 0.52 | 0.31 | 8.2 | 1.682 | 5.14 | 69.9 | 194 |

Under the condition that $\theta_1/2 \leq \theta_2 \leq (\theta_1/2+45°)$, the value of $d_2$ also affects the capacity retention rate of the electrochemical device. As can be seen from the data in Table 2, in contrast with Embodiments 13 to 17, the bonding force between the separator and the electrode plate in Embodiment 18 is relatively reduced due to $d_2$ greater than 10 mm, thereby relatively reducing the hardness of the electrochemical device (that is, deformation resistance), and also relatively reducing the capacity retention rate.

Secondly, the value of $d_1$ also affects the capacity retention rate of the electrochemical device. In contrast with Embodiments 16 and 19 to 21, the space available for transmitting the electrolytic solution and the capacity retention rate in Embodiment 22 are relatively reduced due to $d_1$ greater than 10 mm.

Thirdly, the value of $d_1/d_2$ also affects the capacity retention rate of the electrochemical device. In contrast with Embodiments 19, 20, and 22, the capacity retention rate of the electrochemical device in Embodiment 21 is relatively reduced due to $d_1/d_2$ greater than 5.

Finally, the value of $t_1d_1/(d_1+d_2)$ also affects the capacity retention rate of the electrochemical device. In contrast with Embodiments 19 and 23 to 24, the capacity retention rate of the electrochemical device in Embodiments 25 to 26 is relatively reduced due to $t_1d_1/(d_1+d_2)$ greater than 2.

The foregoing embodiments are merely intended for describing the technical solutions of this application but not intended as a limitation. Although this application is described in detail with reference to the foregoing optional embodiments, a person of ordinary skill in the art understands that modifications or equivalent replacements may be made to the technical solutions of this application.

What is claimed is:

1. An electrochemical device, comprising: a housing, an electrode assembly and an electrolytic solution; the electrode assembly and the electrolytic solution are disposed in the housing; and the electrode assembly comprises electrode plates and a separator disposed between adjacent electrode plates;
   wherein the separator comprises a porous substrate, a first bonding layer, and a second bonding layer, the porous substrate is located between the first bonding layer and the second bonding layer; the first bonding layer comprises a plurality of first bonding regions spaced apart from each other, and the second bonding layer comprises a plurality of second bonding regions spaced apart from each other;
   a thickness direction of the electrode assembly is defined as a first direction; in the first direction, a circumscribed rectangle of a projection of the electrode assembly possesses a diagonal line and a first side, an angle between the diagonal line and the first side is $\theta_1$, and an angle between a projection of each of the plurality of first bonding regions and the first side is $\theta_2$, wherein $\theta_1/2 \leq \theta_2 \leq (\theta_1/2+) 45°$;
   in the first direction, an angle between a projection of each of the plurality of second bonding regions and the projection of each of the plurality of first bonding regions is $\theta_3$, wherein $45° < \theta_3 \leq 120°$.

2. The electrochemical device according to claim 1, $80° \leq \theta_3 \leq 120°$.

3. The electrochemical device according to claim 1, wherein $\theta_3 = 180° - 2\theta_2$.

4. The electrochemical device according to claim 1, wherein $\theta_2 = \theta_1$.

5. The electrochemical device according to claim 1, wherein a direction from one of the plurality of first bonding regions to another adjacent one of the plurality of first bonding regions is defined as a second direction, and in the second direction, a width of each of the plurality of first bonding regions is $d_1$ mm, a distance between adjacent two of the plurality of first bonding regions is $d_2$ mm, and $d_1$ and $d_2$ satisfy at least one of the following conditions:

$$0.1 < d_1 < 10, \text{ and } 0.1 < d_2 < 10; \text{ and}$$

$$0.1 < d_1/d_2 < 5.$$

6. The electrochemical device according to claim 5, wherein in the first direction, a thickness of the first bonding layer is $t_1$ μm, and $0.15 < t_1d_1/(d_1+d_2) < 2$.

7. The electrochemical device according to claim 1, wherein in the first direction, a thickness of the first bonding layer is $t_1$ μm, and $0.1 \leq t_1 \leq 6$.

8. The electrochemical device according to claim 1, wherein the plurality of the first bonding regions are parallel to each other.

9. The electrochemical device according to claim 1, wherein each of the plurality of first bonding regions is discontinuous.

10. The electrochemical device according to claim 1, wherein in the first direction, shapes of the projection of the electrode assembly comprise a rectangle, an arc, or an L shape.

11. The electrochemical device according to claim 1, wherein the electrode assembly further comprises tabs electrically connected to the electrode plates, and projections of the tabs in the first direction connect to an opposite side of the first side.

12. The electrochemical device according to claim 1, wherein structures of the electrode assembly comprise a wound structure or a stacked structure.

13. The electrochemical device according to claim 1, wherein the porous substrate comprises a polymer film, a multilayer polymer film, or a non-woven fabric formed by at least one of polyolefin, polyvinylidene difluoride, polyethylene terephthalate, cellulose, polyimide, polyamide, spandex, or polyphthalamide.

14. The electrochemical device according to claim 1, wherein the first bonding layer comprises a bonding material, and the bonding material comprises at least one of poly(vinylidene difluoride-co-hexafluoropropylene), poly(vinylidene difluoride-co-trichloroethylene), polymethyl methacrylate, polyacrylic acid, polyacrylic acid sodium salt, polyacrylonitrile, polyvinylpyrrolidone, polyvinyl acetate, poly(ethylene-co-vinyl acetate), polyimide, polyethylene oxide, cellulose acetate, cellulose acetate butyrate, cellulose acetate propionate, cyanoethyl pullulan, cyanoethyl polyvinyl alcohol, cyanoethyl cellulose, cyanoethyl sucrose, pullulan, sodium carboxymethyl cellulose, lithium carboxymethyl cellulose, poly(acrylonitrile-co-styrene-co-butadiene), polyvinyl alcohol, polyvinyl ether, polytetrafluoroethylene, polyhexafluoropropylene, poly(styrene-co-butadiene), or polyvinylidene difluoride.

15. An electronic device, comprising an electrochemical device,
the electrochemical device comprises a housing, an electrode assembly and an electrolytic solution; the assembly and the electrolytic are disposed in the housing; and the electrode assembly comprises electrode plates and a separator disposed between adjacent electrode plates;
wherein the separator comprises a porous substrate, a first bonding layer, and a second bonding layer, the porous substrate is located between the first bonding layer and the second bonding layer, the first bonding layer comprises a plurality of first bonding regions spaced apart from each other, and the second bonding layer comprises a plurality of second bonding regions spaced apart from each other;
a thickness direction of the electrode assembly is defined as a first direction; in the first direction, a circumscribed rectangle of a projection of the electrode assembly possesses a diagonal line and a first side, an angle between the diagonal line and the first side is $\theta_1$, and an angle between a projection of each of the plurality of first bonding regions and the first side is $\theta_2$, wherein $\theta_1/2 \leq \theta_2 \leq (\theta_1/2+) 45°$;
in the first direction, an angle between a projection of each of the plurality of second bonding regions and the projection of each of the plurality of first bonding regions is $\theta_3$, wherein $45° \leq \theta_3 \leq 120°$.

16. The electronic device according to claim 15, wherein $80° < \theta3 < 120°$.

17. The electronic device according to claim 15, wherein $\theta_3 = 180° - 2\theta_2$.

18. The electronic device according to claim 15, wherein a direction from one of the plurality of first bonding regions to another adjacent one of the plurality of first bonding region is defined as a second direction, and in the second direction, a width of each of the plurality of first bonding regions is $d_1$ mm, a distance between adjacent two of the plurality of first bonding regions is $d_2$ mm, and $d_1$ and $d_2$ satisfy at least one of the following conditions:

$0.1 < d_1 < 10$, and $0.1 < d_2 < 10$; and $0.1 < d_1/d_2 < 5$.

19. The electronic device according to claim 18, wherein in the first direction, a thickness of the first bonding layer is $t_1$ μm, and $0.15 < t_1 d_1/(d_1+d_2) < 2$.

20. The electronic device according to claim 15, wherein in the first direction, a thickness of the first bonding layer is $t_1$ μm, and $0.1 \leq t_1 \leq 6$.

* * * * *